96.24

Fiber array – Output ends offset See other sheets

INVENTOR.
ROGER L. WILCOX
BY
Davis, Hoxie, Faithfull & Hapgood
ATTORNEYS.

INVENTOR.
ROGER L. WILCOX
BY
Davis, Hoxie, Faithfull & Hapgood
ATTORNEYS.

INVENTOR
ROGER L. WILCOX
BY
Davis, Hoxie, Faithfull & Hapgood
ATTORNEYS.

Aug. 25, 1970 R. L. WILCOX 3,525,800

COMPATIBLE COLOR DISPLAY ARRANGEMENT INCLUDING AN OPTICAL FIBER ARRAY

Filed Oct. 12, 1966 4 Sheets-Sheet 4

INVENTOR
ROGER L. WILCOX

BY

Davis, Hoxie, Faithfull & Hapgood
ATTORNEYS.

United States Patent Office 3,525,800
Patented Aug. 25, 1970

3,525,800
COMPATIBLE COLOR DISPLAY ARRANGEMENT INCLUDING AN OPTICAL FIBER ARRAY

Roger L. Wilcox, Box 534, Amagansett, N.Y. 11930

Continuation-in-part of application Ser. No. 563,197, July 6, 1966. This application Oct. 12, 1966, Ser. No. 586,204
Int. Cl. H04n 5/72
U.S. Cl. 178—5.4 13 Claims

ABSTRACT OF THE DISCLOSURE

An improved color television display cathode ray tube includes cyclically recurring light emitting phosphor sheets coupled to an array of optical fibers. Three electron beams each impinge upon associated like-color emitting ones of the phosphor sheets, and the light pattern produced by the irradiated phosphor sheets is visible at the exit face of the fiber array after undergoing a spatial transformation.

This invention relates to color television systems and, more specifically, to an improved color picture display tube adaptable for use with standard color television receivers. This application is a continuation-in-part of my prior application Ser. No. 563,197, filed July 6, 1966, now Pat. No. 3,461,223.

Prior art color television picture tubes typically include a phosphor dot screen arranged in a pattern of triads, i.e., groups of blue, red and green emitting phosphors. A metal plate, referred to as a shadow mask, is located between the phosphor screen and three electron guns. The mask includes a plurality of apertures therein, and functions to permit the electron beam generated by each gun to energize only an associated color phosphor in each scanned triad. Thus, when the three beams are synchronously swept across an image plane during each picture frame, the beams respectively give rise to blue, red, and green components of a composite displayed image.

However, such shadow mask picture tubes are characterized by several inherent disadvantageous features. First, the shadow mask will typically intercept 85% of the electron beam energy. Hence, beams of a relatively high intensity are required to produce a picture display having adequate brightness for normal viewing. Moreover, the electron impact on the metallic shadow mask gives rise to a magnetic field which must be periodically dissipated to prevent image distortion.

In addition, the focus and directionality of the three electron beams must be accurately regulated such that the beams will penetrate the proper holes in the shadow mask and strike the desired color phosphors during the scanning process. Thus, color receivers utilizing shadow mask color tubes must include relatively complex dynamic beam convergence circuitry.

Further, the resolving power of such prior art picture tubes is inherently limited with respect to black and white tubes since the height of a triad scan point is larged than a black and white scan line. Also, such tubes are inherently characterized by local distortions of the image elements.

It is therefore an object of the present invention to provide an improved color television display tube.

More specifically, an object of the present invention is the provision of an improved color television display organization which inherently provides a relatively bright display with a relatively fine degree of resolution in comparison to prior art, shadow mask color tubes.

These and other objects of the present invention are realized in a specific, illustrative, color television picture tube which has three vertically aligned electron guns for horizontally sweeping across vertically contiguous sheets of blue, red, and green light emitting phosphors. More specifically, a deflection yoke, a static deflection assembly, and a beam deflecting grid assembly are employed to selectively irradiate the phosphor sheets with the electron beams.

The entrance face of a coordinate array of optical fibers or fiber bundles is selectively energized by the activated phosphors. The output port, or exit face of the fiber array is translated with respect to the input port such that triad groups of three optical fibers are sequentially supplied with blue, red, and green light components in an interlaced line pattern. Accordingly, a reconstituted color replica of the transmitted image is traced by the three electron beams on the phosphor strips and displayed to a viewer observing the exit face of the array.

A complete understanding of the present invention may be gained from a consideration of the following detailed description of an illustrative embodiment thereof presented hereinbelow in conjunction with the accompanying drawing, in which.

Figure 1:
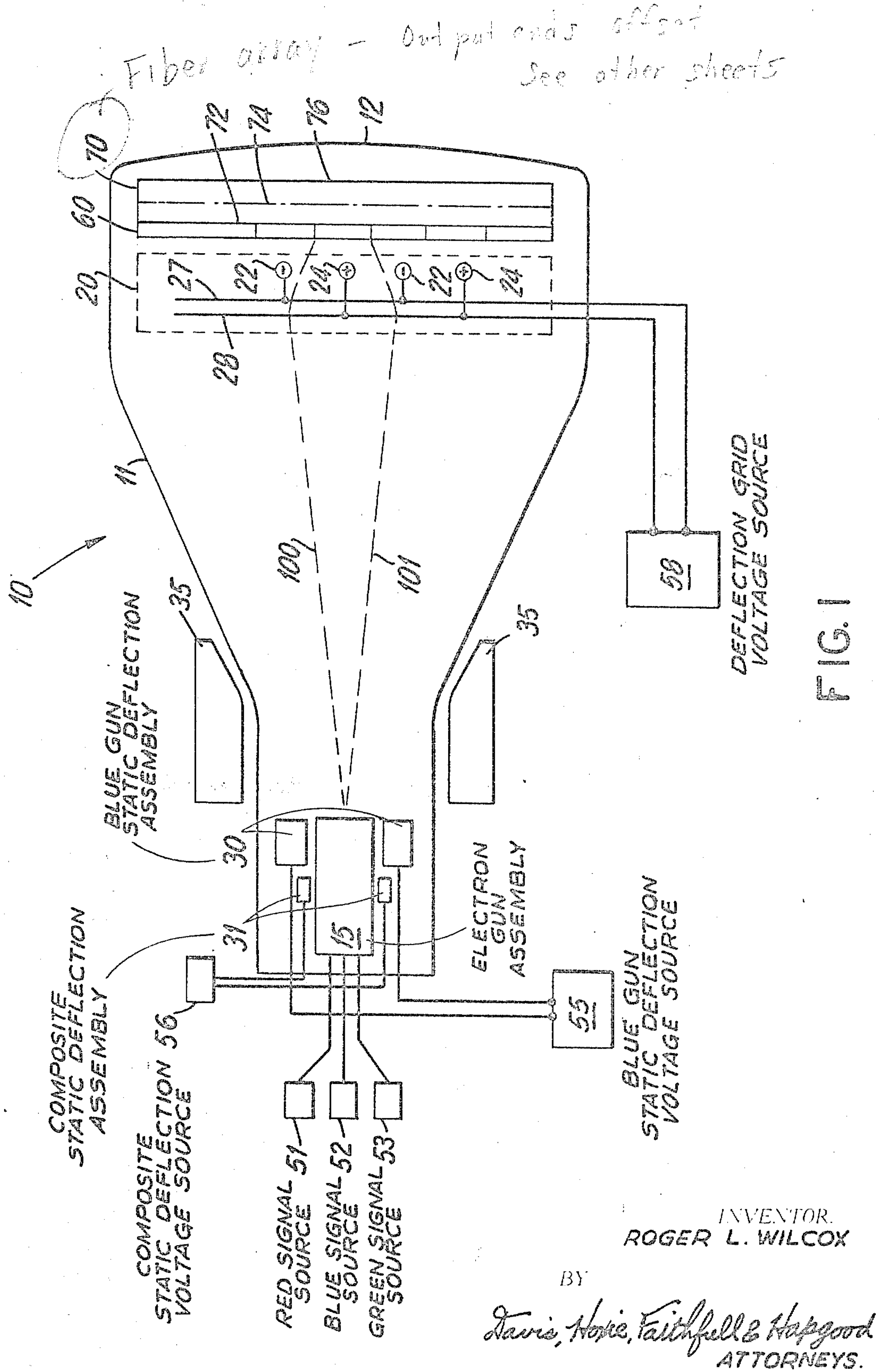
FIG. 1 is a top view of an illustrative television color display arrangement which embodies the principles of the present invention.
Figure 3:
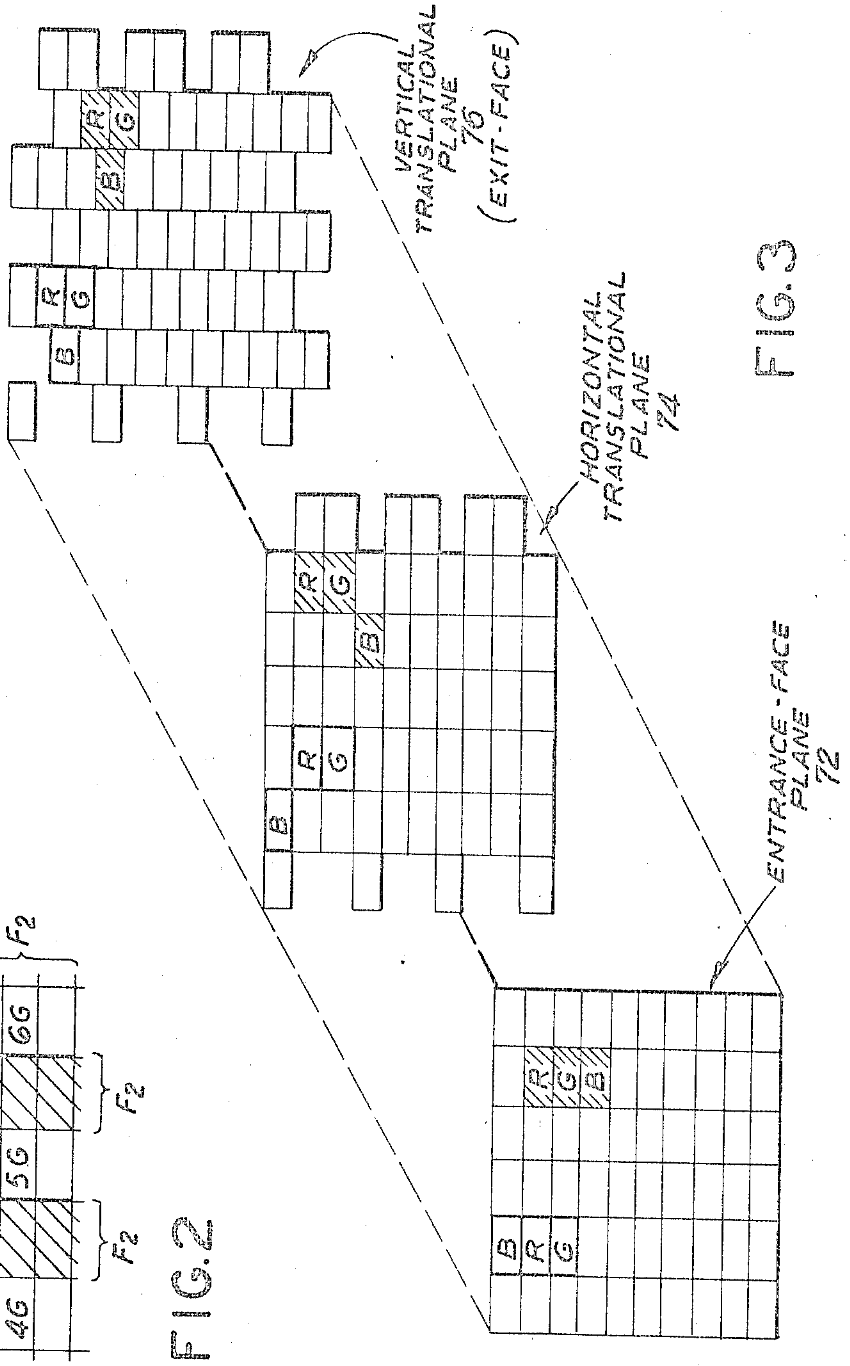
Figure 4:
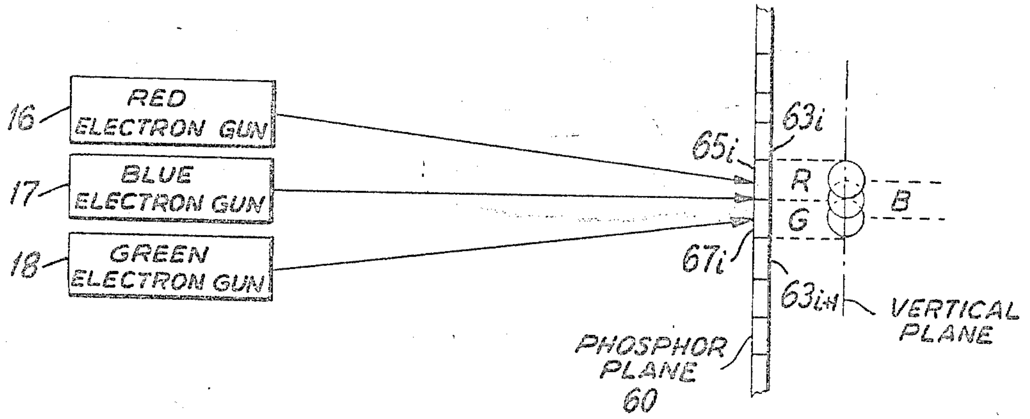
Figure 5:
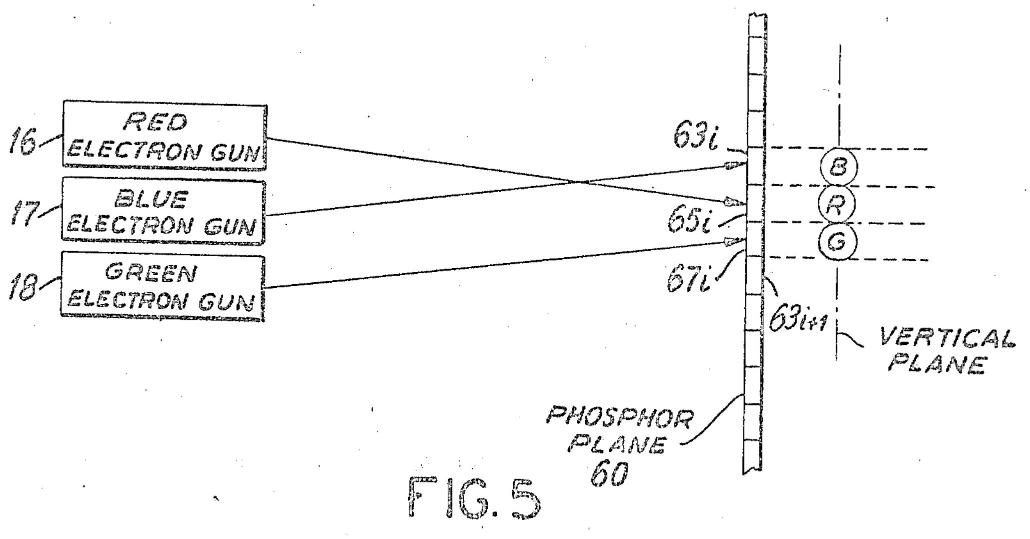
Figure 6:
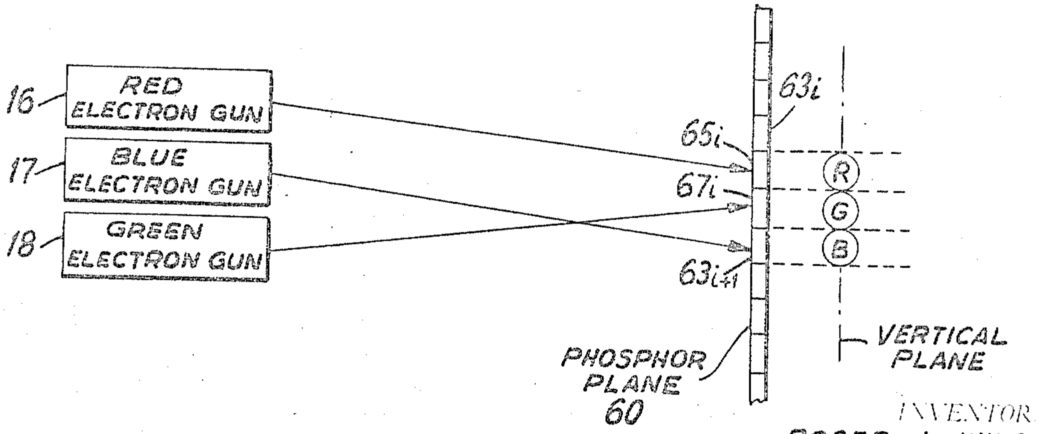
Figure 7A:
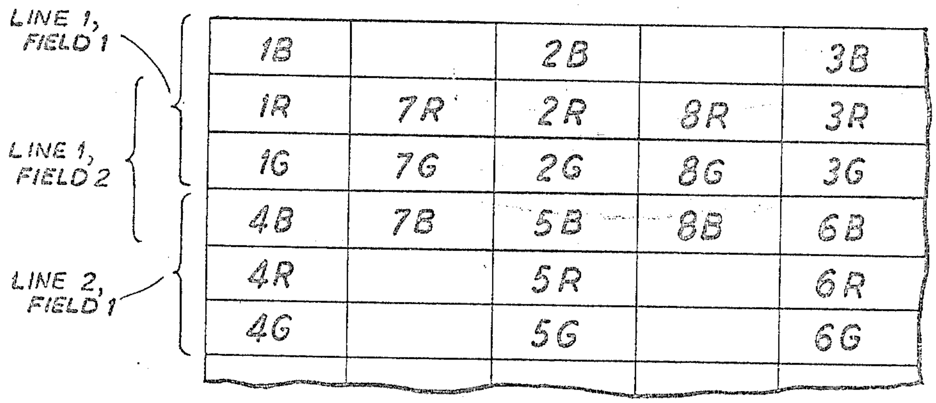
Figure 7B:
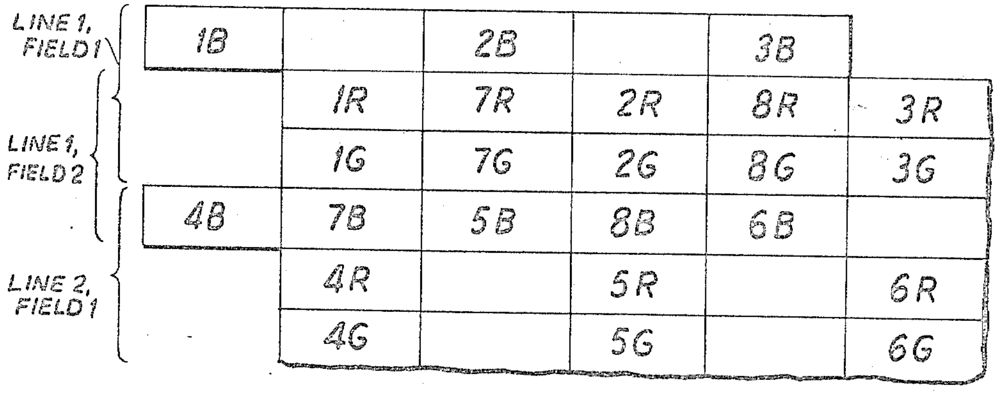
Figure 7C:
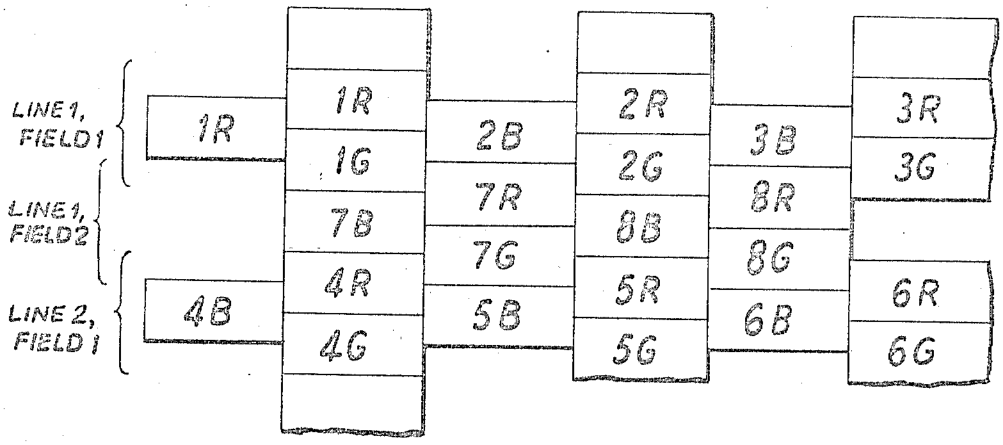

FIG. 3 illustrates the transformation between the entrance and exit faces 72 and 76 of an optical fiber array 70 of FIG. 1;

FIGS. 4 through 6 depicts the relative positioning of red, blue, and green associated electron guns 16, 17 and 18 during various operating modes for the organization depicted in FIG. 1; and FIGS. 7A through 7C depict the manner in which sequentially scanned optical fiber triads are converted by the optical fiber array 70 of FIG. 1 into video scan lines.

Referring now to FIG. 1, there is shown in top view a specific illustrative color picture tube 10 which embodies the principles of the present invention. The tube 10 includes an evacuated tube envelope 11 having associated therewith a transparent viewing face 12, a scan deflection yoke 35, and an electron gun assembly 15 comprising three vertically stacked electron guns 16, 17, and 18 (not shown in FIG. 1). Each of the foregoing tube members may comprise any embodiment thereof well known in the art.

Figure 2:
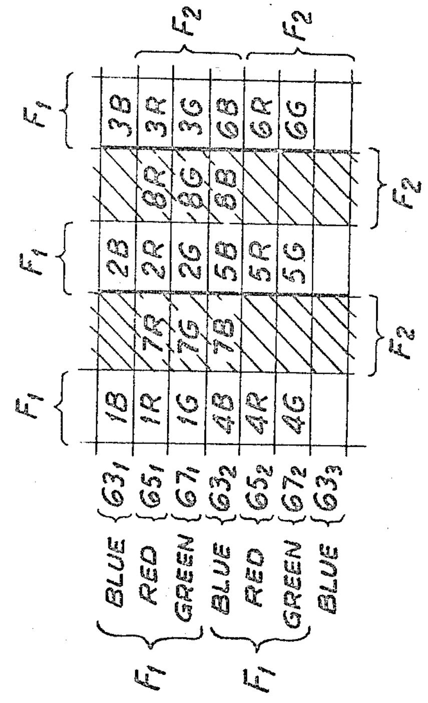
FIG. 2 depicts a phosphor plane 60 employed in the organization shown in FIG. 1.

The electron beams generated by the guns 16, 17 and 18 are directed at a phosphor plane 60 comprising a stacked array of horizontal sheets, or strips of light emitting phosphors. More specifically, as shown in FIG. 2, the plane 60 comprises a vertical array of cyclicly repeating strips 63, 65 and 67 which respectively emit a blue, red, and green illumination when energized with electron beams generated by the electron guns 17, 16 and 18. Accordingly, the elements 16, 17 and 18 will hereinafter be designated as the red, blue, and green electron guns, respectively.

A coordinate array 70 of optical fibers is included in the tube 10 and has an entrance face 72 optically coupled to the output of the phosphor plane 60, and an exit face 76 observable by a viewer via the transparent glass tube face 12. Optical fiber elements are well known and described, for example, in H. B. Cole Pat. No. 2,939,362, issued June 7, 1960 and T. Trott Pat. No. 3,210,462, issued Oct. 5, 1965. Briefly, such fibers are relatively small diameter structures of arbitrary cross-sectional geometry which transmit incident light therethrough along the long dimension of the fibers independent of any bends or curvature thereof.

Structurally, the fibers preferably comprise a high refractive index glass core clad in a low refractive index glass coating. A plurality of the clad fibers may be drawn together in a second low refractive index glass sheath to form multi-fiber bundles of any desired cross-sectional geometry. Such bundles may be utilized as the light-transmitting units or elements in the array 70 of FIG. 1.

Turning now to FIG. 3, there is shown the spatial relationship for the entrance and exit faces 72 and 76 of the optical fiber array 70, as well as the physical transformation therebetween. The fibers in the entrance face 72 comprise a regular cartesian ordering of rows and columns with consecutive rows thereof being optically coupled in one-to-one correspondence to contiguous phosphorous strips in the phosphor plane 60. In particular the fibers designated by a B, R, or G in the drawing are respectively associated with blue, red, or green emitting phosphor strips 63, 65, or 67.

By way of a translation between the fiber array entrance and exit faces 72 and 76, every fiber row associated with blue image components, i.e., every third row which is coupled to a blue emitting phosphor strip 63, is offset one fiber width to the left, as conceptionally shown for a horizontal translation plane 74 in FIG. 3. Next, alternate columns in the array 70 are vertically displaced by one and one-half (1½) fiber units. The composite fiber translation is illustrated by a comparison of the spatial fiber dispositions shown for the entrance and exit faces 72 and 76 in FIG. 3.

The tube 10 (FIG. 1) also includes static deflection assemblies 30 and 31 which are respectively energized by static deflection voltage sources 55 and 56. The assembly 30 is operative in conjunction with the source 55 to deflect the electron beam generated by the blue gun 17 either above or below the red and green beams produced by the guns 16 and 18. In addition the deflection assembly 31 includes a structure which acts in cooperation with the source 56 for deviating the three electron beams in unison by a relative vertical dimension of one conventional scan line between the two fields of one scan frame, preferably during vertical retrace. Such system functioning is required in view of the phosphor plane 60 tracing pattern and the electron collimating operation described hereinafter. The assemblies 30 and 31 may comprise any well-known deflection apparatus such as a plurality of parallel electrostatic deflection plates which have electron accelerating potentials impressed thereon.

Finally, the tube 10 includes a beam deflecting grid assembly 20 comprising two sets of fine wires 22 and 24 which are mounted in an alternating sequence near the phosphor plane 60. The wires 22 and 24 define two sets of alternating columns in phosphor plane 60 on the entrance face 72 of the fibers (see FIGS. 2 and 7A), with the long axis of the columns being colinear with the wires 22 and 24. The wires 22 and 24 are respectively multiply connected by two leads 27 and 28 to a source of grid deflection potential 58.

The deflection voltage source 58 is adapted to impress a positive potential on the wires 22 and a negative potential on the wires 24 during one field of each picture scanning frame, i.e., for 1/60 of a second and to reverse these potentials during the alternate field of each frame. As shown for the electron projectories 100 and 101 in FIG. 1 for an assumed potential condition for the wires 22 and 24 shown therein, the deflection grid assembly 20 is operative to focus electrons onto one set of columns in the phosphor plane 60 (FIG. 2) during one potential condition therefore, and to focus incident electrons to the alternate column set when the alternate potential condition exists. Hence, as will be discussed in more detail hereinafter, the deflection grid 20 directs all incident electrons to alternately spaced columns during one field of each scan frame, and directs the picture generating electrons to the alternate set of columns during the second field of each frame.

The composite picture generating organization of FIG.

1 includes three signal sources 51, 52 and 53 for respectively controlling the intensities of the electron beams generated by the red, blue, and green guns 16, 17 and 18. Such voltage source may advantageously comprise the well-known circuit configurations therefore included in present day color television receivers.

To effect the picture generating scanning process described hereinafter, the beams generated by the electron guns 16 through 18 are quiescently adapted to overlap when they impinge upon the phosphor plane 60, in the manner depicted in FIG. 4. That is, the beams generated by the red and blue guns 16 and 18 abut and are directed at red and green phosphor strips 65 and 67, while the blue beam equally overlaps the other electron areas. It is noted that the height of each beam is advantageously made approximately equal to the height of a single phosphor strip.

During the first field of each frame, the static deflection assembly 30 deflects the blue electron beam generated by the gun 17 above the red beam as shown in FIG. 5, hence directing the beam to a blue phosphor strip 63 disposed above the red and green strips 65 and 67. Conversely, during the second, interlaced field of each frame, the blue beam is positioned by the assembly 30 below the red and green beams, as depicted in FIG. 6. The field scanning timing for the static deflection assemblies 30 and 31, which comprises a thirty cycle per second frame rate corresponding to a sixty cycle per second field rate, may be derived from several electronic circuit points included in conventional television receivers, i.e., at the output of the synchronizing information separation or detecting stages.

In addition, for reasons which will become apparent in view of the scanning process described hereinbelow, the static deflection assembly 31 includes deflection plates for translating all three electron beams upwards one scan line with respect to first field operation during the second field of each frame. That is, the phosphor sheets within the $F_1$ brackets (FIG. 2) are scanned during the first field of each frame and the sheets within the $F_2$ brackets are traced during the second field interval.

Finally, it is observed that the deflection yoke 35 is connected to a standard television receiver sweep circuit (not shown in FIG. 1) and, consequently, vertical and horizontal deflections of the beams occur in the standard manner. That is, the beam scanning provides interlaced lines in two alternate fields to complete each frame. The three electron beams are traversed by the yoke 35 across the phosphor strips in the phosphor plane 60, independent of any cooperating action on the beams produced by the static deflection assemblies 30 and 31 or the deflection grid assembly 20.

The particular manner in which the scanning process functions to produce a color image observable at the face 12 of the color tube 10 will now be considered. During the first field of each frame ($F_1$ in FIG. 2), the static deflection assembly 30 constrains in the blue gun 17 to produce a beam vertically above the red and green beams, as shown in FIG. 5. Referring now to FIGS. 2 and 7A, which respectively depict the phosphor plane 60 and the optical fiber entrance face 72 which is immediately behind the plane 60, the blue, red and green beams are swept by the yoke 35 across the upper blue, red and green phosphor strips $63_1$, $65_1$ and $67_1$, respectively.

The polarity of the potential supplied by the deflecting grid voltage source 58 to the deflecting grid assembly 20 collimates the electron beams through a focusing action, i.e., causes the three beams to fall only on the unshaded areas (FIG. 2) of the phosphor strips 63, 65 and 67 during first field scanning. In particular, during the upper line scan for the first field, the phosphor strip and optical triad combinations designated 1, 2 and 3 in FIGS. 2 and 7A are successively selectively illuminated by the electron guns 16 through 18 in accordance with color picture signals supplied thereto by the red, blue and green voltage sources 51, 52 and 53.

The entrance face optical fiber triads designated 1, 2 and 3 in FIG. 7A lie directly behind the similarly designated illuminated phosphor plane 60 segments, and are selectively energized by the activated phosphors during the first line, first field scan. Referring to FIGS. 7A through 7C and the spatial translations undergone by the optical fiber triads 1, 2 and 3, it is observed that the above first line scanning process has in fact produced a contiguous scan line of triad color combinations at the face of the tube, i.e., at the exit face 76 of the optical fiber array 70. Thus, the scanning signal has produced an image line which is observable to the viewer through the tube face 12.

Similarly, for the second line of the first field the next lower non-shaded triad collimated elements 4, 5 and 6 are operated on, producing the corresponding second line, first field, scan line shown in FIG. 7C again bearing the designations 4, 5 and 6. The above procedure continues for the first field until alternate lines down the entire exit face 76 of the optical fiber array 70 are activated during the first scan field.

For the second field of each frame, the static deflection assembly 30 rearranges the blue beam beneath the red and green beams, as depicted in FIG. 6. During the first line of the second field, the beams generated by the guns 16, 17 and 18 are respectively focused to strike the shaded columns of red, green and blue phosphor strips $65_1$, $67_1$ and $63_2$ under the action of the static deflection assembly 30, the static deflection assembly 31 and the focusing grid assembly 20. As discussed above, the beam energy is directed to the shaded, rather than unshaded areas of the phosphor plane 60 shown in FIG. 2 since the polarity of the potentials supplied by the source 58 to the grid wires 22 and 24 reverse sign during the second scan field as compared with the first scan field.

By reason of the foregoing, the three-color triads 7 and 8 shown in FIG. 7A are sequentially illuminated by the phosphor strips $65_1$, $67_1$ and $63_2$ in accordance with the image to be displayed. Tracing through the translation of the corresponding optical fiber array elements disposed behind the energized phosphor strips, as shown in FIGS. 7A through 7C, note that the triads 7 and 8 form a contiguous scan line interlaced between the first and second lines of the first field. Second field scanning proceeds in the above manner to produce a plurality of image lines which are dispersed, i.e., interlaced between lines produced during the tracing of the first field.

Hence, it is seen that the entire picture displayed at the face 12 of the tube 10 is generated once each frame (every 1/30 of a second) in accordance with conventional display practice. That is, the scanning process produces a conventional two field interlaced line pattern which is fully compatible with monochromatic as well as color television transmission. Moreover, it is observed from FIGS. 2, 7A and 7C that two display scan lines are generated for each triad of three phosphor strips, and thereby also for every three optical fiber rows.

It is noted that all of the electron beam energy generated by the guns 16 through 18 results in display imagery. Thus, beams of a lower intensity than those required in prior art shadow mask-type tubes may be employed. Also, displays of sufficient intensity for projection and reproduction may be generated by the picture tube described herein. In addition, a tube made in accordance with the principles of the present invention is characterized by greater resolution and less inherent distortion than prior art color display devices.

It is to be understood that the above described arrangement is only illustrative of the application of the principles of the present invention. Numerous other arrangements may be devised by those skilled in the art without departing from the spirit and scope of the invention.

What is claimed is:

1. In combination in a color display tube, a plurality of electron guns, an array of optical fibers including an entrance face and an exit face, said entrance and exit faces including a substantially like number of separate and distinct optical fiber ends corresponding to the number of optical fibers in said array, and a phosphor plane comprising a stacked array of different color light emitting phosphor sheets interposed between said electron guns and said entrance face of said optical fiber array, said phosphor sheets cyclically recurring in said array, each of said electron guns selectively irradiating associated ones of said plural phosphor sheets of a particular, associated, light emitting color.

2. A combination as in claim 1 further comprising first and second alternating pluralities of beam deflecting grid wires disposed between said electron guns and said phosphor strips.

3. A combination as in claim 2 further comprising a potential source for alternately energizing each wire in said two grid wire pluralities with potentials of an unlike amplitude.

4. A combination as in claim 3 further comprising a static deflection assembly for deviating the electron beams supplied by said electron guns.

5. A combination as in claim 4 further comprising means for sweeping said electron beams generated by said electron guns across said phosphor sheets in a synchronous manner and in an interlaced pattern, said grid energizing potential source including means independent of video picture information for periodically and alternately varying the energization supplied to said grid wire pluralities.

6. A combination as in claim 5 further comprising color information voltage sources for controlling the beam intensities generated by said electron guns.

7. A combination as in claim 1 wherein said fiber array entrance face is characterized by a regular array of fiber rows and columns.

8. In combination in a color display tube, a plurality of electron guns, an array of optical fibers including an entrance face and an exit face, and a phosphor plane comprising an array of different color light emitting phosphor sheets, said sheets being cyclically recurring, interposed between said electron guns and said entrance face of said optical fiber array, wherein said fiber array entrance face is characterized by a regular array of fiber rows and columns, and wherein said optical fiber array is characterized by a translation between the entrance and exit faces thereof such that every third row is horizontally displaced and alternate columns are vertically displaced.

9. A combination as in claim 1 further comprising means for sweeping the electron beam generated by said electron guns in unison across said phosphor sheets in an interlaced line pattern.

10. A combination as in claim 1 further comprising first static deflection means for selectively deflecting the electron beam generated by one of said electron guns above and below the beam generated by the other two guns, and additional static deflection means for selectively vertically deflecting said three electron beams in unison.

11. In combination, means for generating three electron beams, a plane comprising plural cyclically recurring phosphor areas each of which emits a different color illumination, scanning means for effecting an interlaced line trace of said beams generated by said electron beam generating means across said phosphor areas, each of said electron beams irradiating phosphor areas emitting only one, like color, an optical fiber array optically coupled to said phosphor plane, first and second alternating pluralities of beam deflecting grid wires disposed between said electron guns and said phosphor areas, and means for periodically reversing the voltage gradient between said first and second grid wire pluralities.

12. A combination as in claim 11 wherein said optical fiber array includes an entrance face characterized by a cartesian array of fiber rows and columns, and further includes an exit face.

13. In combination, means for generating three electron beams, a plane characterized by an array of cyclically recurring phosphor areas each of which emits a different primary color illumination, means for sequentially tracing said beams generated by said electron beam generating means across associated subjects of said phosphor areas, and an optical fiber array optically coupled to said phosphor plane, wherein said optical fiber array includes an entrance face characterized by a Cartesian array of fiber rows and columns, and further includes an exit face, and wherein said optical fiber array is characterized by a translation between the entrance and exit faces thereof such that every third row is horizontally displaced and alternate columns are vertically displaced.

References Cited

UNITED STATES PATENTS

| | | | |
|---|---|---|---|
| 3,130,263 | 5/1964 | Manning | 178—5.4 |
| 3,176,185 | 3/1965 | Inaba | 178—5.4 |
| 3,267,209 | 8/1966 | Nagamori | 178—5.4 |

ROBERT L. GRIFFIN, Primary Examiner

J. C. MARTIN, Assistant Examiner